April 28, 1936.  J. A. ROCHÉ  2,038,603
STOP FLUTTER DEVICE
Filed March 2, 1935
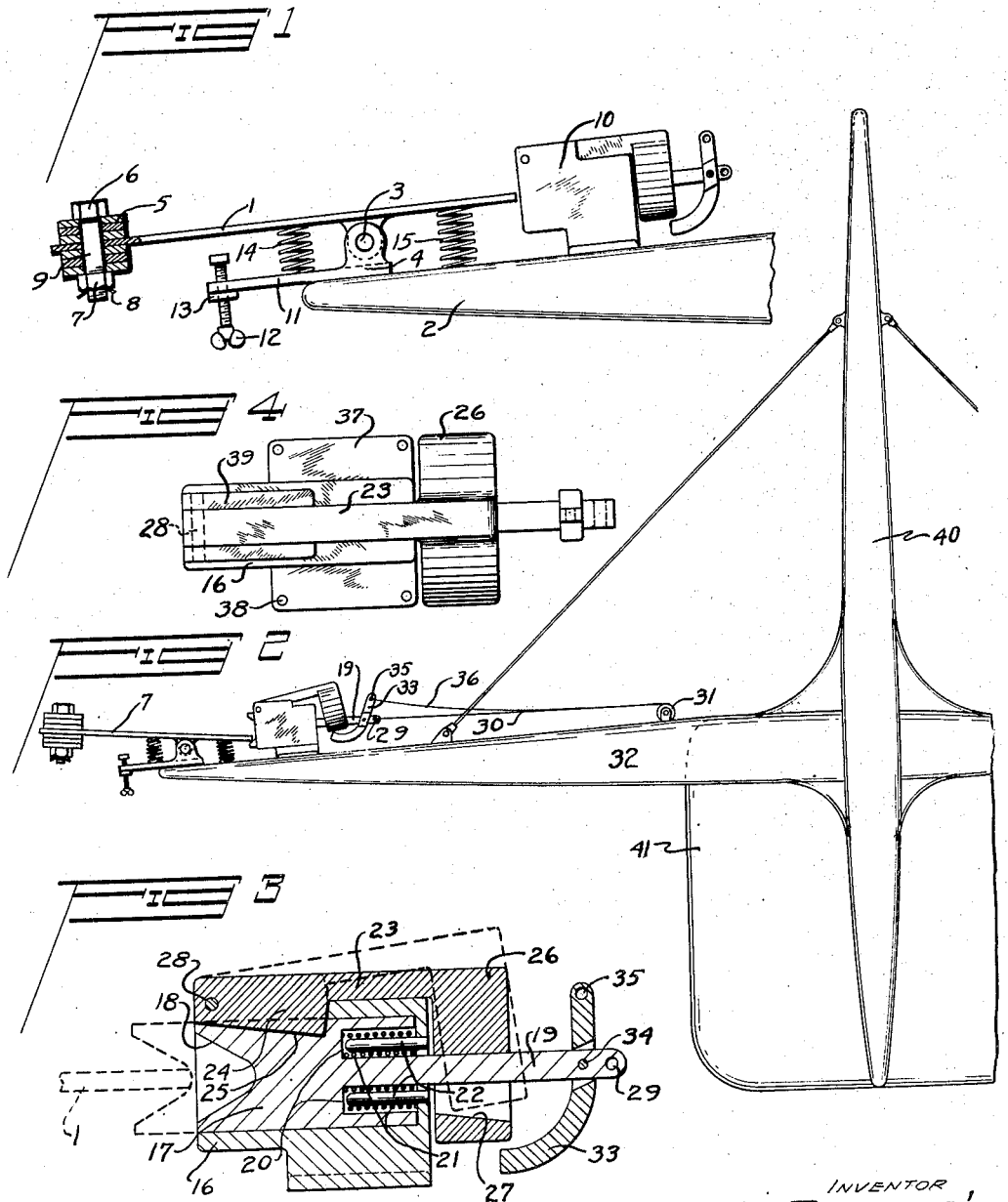
INVENTOR
JEAN A. ROCHÉ
BY
ATTORNEYS Patented Apr. 28, 1936

2,038,603

UNITED STATES PATENT OFFICE 2,038,603

STOP FLUTTER DEVICE

Jean A. Roché, Dayton, Ohio

Application March 2, 1935, Serial No. 9,062

5 Claims. (Cl. 244—31)

(Granted under the act of March 3, 1883, as amended April 30, 1928; 370 O. G. 757)

The invention described herein may be manufactured and used by or for the Government for governmental purposes, without the payment to me of any royalty thereon.

My invention is intended for attachment to any structure suspected of developing dangerous flutter.

When so installed, the device serves a twofold object. It furnishes positive evidence of the presence or absence of dangerous flutter and further stops the aforesaid flutter in its incipient stages.

The device is particularly adapted for mounting upon the wing tips, fixed surfaces, struts or wires of aircraft, either internally or externally as space permits with respect to the particular flutter element with which it is associated. It is also applicable to vehicles other than aircraft.

As originally developed, the device was primarily intended as a safety measure for use in diving or high speed tests of airplanes in which the structural strength is known to be satisfactory, but in which it is feared that a resonant flutter may build up to destructive proportions.

With the foregoing and other objects in view, which will appear as the description proceeds, the invention consists of certain new and novel improvements in stop flutter devices, which will be hereinafter more fully illustrated and described in the accompanying drawing and more particularly pointed out in the appended claims.

Referring to the drawing, in which numerals of like character designate similar parts throughout the several claims:

Fig. 1 is a side view of the device attached to the tip of an airplane horizontal surface.

Fig. 2 shows application of the device to the tip of an airplane stabilizer.

Fig. 3 is a cross-sectional view of the arresting portion of the device.

Fig. 4 is a plan view of the arresting portion.

It is well known to those skilled in the art that vibration in any structure can be dampened out by a device consisting of a counterweighted spring rigidly connected to a predetermined portion of the vibrating structure. It is essential that the aforementioned spring assembly be adjusted such that it is tuned to the natural frequency of the flutter element to which it is attached. If so tuned, when flutter occurs, forces will be set up by the weight and spring element which will neutralize the flutter, thus preventing resonant flutter building up to a destructive stage.

It is an object of this invention to function not only as a stop flutter device, but also as a device for determining whether or not the structure to which it is attached may be vibrated to the destructive stage. With the foregoing in mind I have hinged the spring portion of my device such as to render it inactive, at the will of an aircraft pilot, in order to permit structural flutter to come into being, through the medium of secondary air forces or engine vibration.

Fig. 1 shows cantilever spring 1 pivotally secured to any surface 2 suspected of developing dangerous vibration by means of a hinge pin 3 and mounting bracket 4. At the outer extremity of the cantilever spring 1 are mounted a plurality of washers 5, by means of a bolt 6, a nut 7 and a cotter pin 8. The aforesaid assembly of parts may be said to compose a counterweight 9, of predetermined mass. Momentarily considering the inner end of the spring 1 to be fixed, the combined structure of the outer or overhanging portion of the cantilever spring 1 and the counterweight 9 is so proportioned that the vibration frequency thereof will be identical to the vibration frequency of the surface 2, when the latter is disturbed by exterior forces such as those experienced during high speed or diving tests of aircraft.

In order to obtain selective fixity of the inner extremity of the cantilever spring 1, my invention is provided with a latching device 10. The device 10 is shown in disengaged position, which is the normal adjustment for my invention during the initial stage of aircraft flight. It is not essential at this point to enumerate the various functions performed by the device 10. Attention, rather, will be devoted to the remaining secondary improvement incorporated in Fig. 1. It will be noted that the bracket 4 projects beyond the tip extremity of the surface 2 in an arm 11. The outer end of the arm 11 is provided with a wing bolt 12 and lock nut 13. The foregoing parts have been added in order that, in a state of rest, the inner extremity of the cantilever spring 1 may be maintained in operative alignment with the device 10. Were it not for the aforementioned improvement, the outer extremity of the cantilever spring 1 would fall downward until it contacted the tip extremity of the surface 2. Care must be taken, however, that the upper extremity of the wing bolt 12 does not interfere with the dampening motion of the cantilever spring 1 and attached counterweight 9. It may be found desirable to substitute helical springs 14 and 15 for the wing bolt 12 shown in Fig. 1, in order that upward and downward movements of the outer extremity of the cantilever spring 1 and weight 9, during flight maneuvers, do not cause the inner end of the cantilever spring 1 to move out of alignment with the device 10. The spring 14 may also be eliminated through fixity of the top and bottom extremities of the spring 15 to the lever 1 and surface 2, respectively. All of the aforementioned refinements are of secondary importance. It is of primary importance that the cantilever spring 1 and counterweight 9 be hinged about the pin 3 such that with the device 10 disengaged, the vibration frequency thereof shall be appreciably different from that of the surface 2.

It is essential, at this point, that the composition and operation characteristics of the latching device 10 be disclosed. In Fig. 3, a housing 16 is provided with a bolt 17. The forward extremity of the bolt 17 is provided with a V-shaped notch 18 adapted to fixedly engage the inner extremity of the cantilever spring 1, when projected from the housing 16, in order that the spring be held rigid with respect to the surface 2. The central portion of the bolt 17 is extended rearwardly through an opening in the housing 16 to form an arm 19. The rear face of the bolt 17 is provided with holes 20 into which are inserted springs 21. Guide pins 22 are fixedly secured to the rear face of the housing 16, coaxial with the springs 21, in order that the springs 21 may be held in proper alignment during protrusion of the V-shaped notch 18 of the bolt 17 from the forward extremity of the housing 16. The upward forward portion of the housing 16 is cut away to provide for installation of a counterweighted lever 23. The forward lower extremity of the counterweighted lever 23 is provided with a sear 24 adapted to operably engage a sear seat 25 provided in the upper forward portion of the bolt 17. As shown in Fig. 3, the sear 24 and sear seat 25 are in "fixed" engagement, thus securing the V-shaped notch 18 from protruding from the forward face of the housing 16. The counterweighted lever 23 is provided at its rear with a weighted disc 26, having slotted opening 27 permitting free passage of the arm 19 to the rear thereof. A pin 28 secures the forward extremity of the counterweighted lever 23 to the housing 16.

It will be noted that when the bolt 17 is compressed entirely within the housing 16, through the exertion of tension upon the arm 19 by means of a hole 29 and a cable 30 shown in Fig. 2, gravity will cause the counterweighted lever 23 to assume the position shown in Fig. 3, in which escape of the bolt 17 from its recess within the housing 16 is prevented by the sear 24 and sear seat 25. If the structure to which the device 10 is secured is suddenly subjected to a sharp downward blow, or series of equivalent oscillations, inertia within the weighted disc 26 will cause disengagement of the sear 24 from the sear seat 25. It will be noted that the vertical dimensions of the opening 27 are just sufficient to permit the lowermost surface of the sear 24 to lie in intimate contact with the upper rear surface of the bolt 17. Through the aforementioned limitation, the counterweighted lever 23 is secured against movement relative to the housing 16 whenever the V-shaped notch 18 of the bolt 17 protrudes from said housing.

It is essential to the operation of the device 10 that the V-shaped notch 18 be automatically projected from the housing 16 at the very inception of vibrations of predetermined magnitude in the surface to which the device 10 is fixedly attached. It is only through the foregoing characteristic that dangerous flutter may be dampened out before reaching a destructive magnitude. It is a second essential of the device 10 that the pilot of the aircraft be able during flight to cause manual engagement of the device 10 with the inner extremity of the cantilever spring 1. Double precaution must be exercised during initial test of experimental aircraft where the performance of diving or high speed tests is involved. It is a still further essential of the device 10 that following execution of the above or other predetermined maneuver, that the pilot may at will disengage the device 10 from the inner extremity of the cantilever spring 1. This final design feature permits utilization of the device 10 as a telltale, the pilot's manual control being so constructed and arranged as to indicate engagement of the device 10 with the inner end of the cantilever spring 1.

Referring to Fig. 2, the cable 30 is led to tandem pulleys 31 installed upon the upper surface of a stabilizer 32 and from thence to the pilot's cockpit over a secondary pulley system (not shown). The pilot may thus disengage the V-shaped notch 18 from the inner extremity of the cantilever spring 1 at will. It is essential that tension in the cable 30 in no wise interfere with projection of the V-shaped notch 18 without the housing 16. Manual reengagement by the pilot of the notch 18 with the inner extremity of the cantilever spring 1 is accomplished through installation of a J-shaped lever 33 towards the rear of the arm 19 by means of a pin 34. It will be noted that the lower extremity of the lever 33 is adapted to contact and raise the weighted disc 26 of the counter-weighted lever 23 until the lower surface of the opening 27 is brought into contact with the lower surface of the arm 19. As shown in Fig. 2, it will be noted that slack occurs in a cable 36 secured to the upper portion of the lever 33 by means of a hole 35 for the reason that this particular figure illustrates inertia release of the V-shaped notch 18 from the housing 16. When pilot release is effected, the cable assumes a straight line between the hole 35 and the tandem pulleys 31, from whence it is led by a further pulley system to the pilot's cockpit. Gravity is sufficient to force the lower extremity of the lever 33 downward when the pilot manually withdraws the V-shaped notch 18 entirely within the housing 16.

Fig. 4 shows a plan view of the device 10 in which a base 37 is provided with bolt holes 38 for securing the housing 16 to its supporting surface. A vertical flange 39 is provided on each side of the forward extremity of the counterweighted lever 23 to guide same longitudinally with respect to the housing 16 and to further provide support for the pin 28. The plan contour of the weighted disc 26 is also clearly shown.

In Fig. 2 the stabilizer 32, rudder 40 and fuselage 41 are subjected to a sharp downward impulse. Inertia causes the weight 9 and the weighted disc 26 to remain suspended in their initial positions during downward travel of the bracket 4 and housing 16. The overhanging portion of the J-shaped lever 33 also seeks to retain its initial position with respect to the weighted disc 26 through pivotation about the pin 34. The aforementioned impulse also results in dual pivotation of the lever 1 about the pin 3 and the counterweighted lever 23 about the pin 28. The latter pivotation has released the notch 18 from within the housing 16, which is seen to engage at its lowermost extremity the inner extremity of the cantilever spring 1. It will be noted that the helical spring 15 prevents the inner extremity of the cantilever spring 1 from assuming a position below the engaging area of the lower jaw of the notch 18. With initial issue of the notch 18 from the housing 16, the counterweighted lever 23 is locked with reference to the housing 16, permitting the notch 18 to advance until the inner extremity of the lever 1 is seated at the base thereof. The longitudinal axis of the inner extremity of the lever 1 will thus become coincident and fixed in regard to the longitudinal axis of the device 10, remaining thus until released by the pilot in the manner heretofore enumerated.

Since my device is inertia actuated, it is obvious that the cantilever spring 1, mounting bracket 4, locking device 10 and helical spring 15 (used in combined tension and compression) of Fig. 1 may be removed from the horizontal installation shown in Fig. 2 and reinstated vertically upon the overhanging upper portion of the fin supporting the rudder 40; with such redisposition of the weighted disc 26, that the sear 24 will engage the sear seat 25, upon tensioning of the cable 30. It is further essential, in the foregoing weight redisposition, that inertia disengagement of the sear 24 be not impaired; i. e., that the center of gravity of the weight be disposed well below the pin 28.

I claim:

1. A stop flutter device for mounting upon a structure having a known frequency of vibration comprising, an elongated flexible member having one end predeterminately weighted, a bracket fixed to a predetermined portion of said structure and pivotally attached to said member inboard of the non-weighted end thereof, and inertia operated means for predeterminately positioning said member approximately parallel to said structure such that said unweighted end from bracket to tip is fixed with respect to, but that said weighted end from bracket to tip is flexible with respect to its supporting structure end capable of vibration frequency corresponding to, but in a direction opposite to said known vibrations.

2. A stop flutter device for mounting upon a structure having a known frequency of vibration comprising, an elongated flexible member having one end predeterminately weighted, a bracket fixed to a predetermined portion of said structure and pivotally attached to said member inboard of the non-weighted end thereof, means for predeterminately limiting pivotal movement of the non-weighted end of said member relative to said structure, and a locking device for selectively fixing the aforesaid end against pivotation such that said weighted end from bracket to tip is flexible with respect to its supporting structure and capable of vibration frequency corresponding to but in a direction opposite to said known vibrations.

3. A stop flutter device for mounting upon a structure having a known frequency of vibration comprising, an elongated flexible member having one end predeterminately weighted, a bracket fixed to a predetermined portion of said structure, said elongated flexible member being freely rotatably attached to said bracket inboard of the non-weighted end thereof, and remotely controlled means whereby said elongated flexible member can be selectively fixed approximately parallel to said structure such that the unweighted end thereof from bracket pivot to tip is fixed with respect to, but that said weighted end from bracket to tip is flexible with respect to its supporting structure and capable of vibration frequency corresponding to but in a direction opposite to said known vibrations.

4. A stop flutter device for mounting upon a structure having a known frequency of vibration comprising, an elongated flexible member having one end predeterminately weighted, a bracket fixed to a predetermined portion of said structure, said elongated flexible member being freely rotatably attached to said bracket inboard of the non-weighted end thereof, and manually actuated means whereby said elongated flexible member can be selectively fixed approximately parallel to said structure such that the unweighted end thereof from bracket pivot to tip is fixed with respect to, but that said weighted end from bracket to tip is flexible with respect to its supporting structure and capable of vibration frequency corresponding to but in a direction opposite to said known vibrations.

5. A stop flutter device for mounting upon a structure having a known frequency of vibration comprising, an elongated flexible member having one end predeterminately weighted, a bracket fixed to a predetermined portion of said structure and pivotally attached to said member inboard of the non-weighted end thereof, inertia operated means for predeterminately positioning said member approximately parallel to said structure and remotely controlled means whereby said member may be released from the aforesaid position in which said unweighted end from bracket to tip is fixed with respect to, but that said weighted end from bracket to tip is flexible with respect to its supporting structure and capable of vibration frequency corresponding to, but in a direction opposite to said known vibrations.

JEAN A. ROCHÉ.